United States Patent [19]

Nilsen

[11] Patent Number: 5,117,432
[45] Date of Patent: May 26, 1992

[54] VANADIUM-PUMPED TITANIUM X-RAY LASER

[75] Inventor: Joseph Nilsen, Livermore, Calif.

[73] Assignee: The United States of America as represented by the United States Department of Energy, Washington, D.C.

[21] Appl. No.: 654,457

[22] Filed: Feb. 13, 1991

[51] Int. Cl.⁵ .............................................. H01S 3/30
[52] U.S. Cl. ............................................. 372/5; 372/7; 372/39; 372/70
[58] Field of Search ...................... 372/5, 7, 39, 66, 70

[56] References Cited

U.S. PATENT DOCUMENTS

| 4,731,786 | 3/1988 | MacGowan et al. | 372/5 |
| 4,827,479 | 5/1989 | Campbell et al. | 372/5 |
| 4,977,572 | 12/1990 | Nilsen | 372/5 |
| 5,003,544 | 3/1991 | Nilsen | 372/5 |

Primary Examiner—William L. Sikes
Assistant Examiner—Robert E. Wise
Attorney, Agent, or Firm—Miguel A. Valdes; Roger S. Gaither; William R. Moser

[57] ABSTRACT

A resonantly photo-pumped x-ray laser (10) is formed of a vanadium (12) and titanium (14) foil combination (16) that is driven by two beams (18, 20) of intense line focused (22, 24) optical laser radiation. Ground state neon-like titanium ions (34) are resonantly photo-pumped by line emission from fluorine-like vanadium ions (32).

10 Claims, 4 Drawing Sheets

Table 1. Laser transitions, wavelengths, and gains for Ne-like Ti

| Transition | Wavelength(Å) | Gain(cm$^{-1}$) for n$_\lambda$ = | | |
|---|---|---|---|---|
| | | 0.005 | 0.010 | 0.020 |
| $\overline{2p}_{1/2}\,3p_{1/2}\,(J=0) \to \overline{2p}_{1/2}\,3s_{1/2}\,(J=1)$ | 326.5 | 2.90 | 6.81 | 9.91 |
| $\overline{2p}_{1/2}\,3p_{3/2}\,(J=2) \to \overline{2p}_{1/2}\,3s_{1/2}\,(J=1)$ | 472.1 | | 0.56 | 2.18 |
| $\overline{2p}_{1/2}\,3p_{3/2}\,(J=1) \to \overline{2p}_{1/2}\,3s_{1/2}\,(J=1)$ | 473.2 | 2.10 | 5.45 | 8.78 |
| $\overline{2p}_{1/2}\,3p_{1/2}\,(J=1) \to \overline{2p}_{1/2}\,3s_{1/2}\,(J=1)$ | 506.2 | 2.90 | 7.44 | 11.88 |
| $\overline{2p}_{3/2}\,3p_{1/2}\,(J=0) \to \overline{2p}_{1/2}\,3s_{1/2}\,(J=1)$ | 508.8 | 1.26 | 2.92 | 4.13 |
| $\overline{2p}_{3/2}\,3p_{1/2}\,(J=0) \to \overline{2p}_{3/2}\,3s_{1/2}\,(J=1)$ | 285.1 | 1.35 | 3.14 | 4.48 |
| $\overline{2p}_{3/2}\,3p_{3/2}\,(J=0) \to \overline{2p}_{3/2}\,3s_{1/2}\,(J=1)$ | 415.4 | 2.99 | 6.83 | 9.43 |
| $\overline{2p}_{3/2}\,3p_{3/2}\,(J=2) \to \overline{2p}_{3/2}\,3s_{1/2}\,(J=1)$ | 459.4 | 0.56 | 2.13 | 4.33 |
| $\overline{2p}_{3/2}\,3p_{3/2}\,(J=1) \to \overline{2p}_{3/2}\,3s_{1/2}\,(J=1)$ | 478.7 | 3.19 | 8.38 | 13.09 |
| $\overline{2p}_{3/2}\,3p_{1/2}\,(J=2) \to \overline{2p}_{3/2}\,3s_{1/2}\,(J=1)$ | 507.6 | 1.30 | 4.15 | 7.75 |

FIG. 1B

VANADIUM-PUMPED TITANIUM X-RAY LASER

The U.S. Government has rights to this invention pursuant to Contract No. W-7405-ENG-48 between the U.S. Department of Energy and the University of California, for the operation of Lawrence Livermore National Laboratory.

BACKGROUND OF THE INVENTION

The invention described herein relates generally to x-ray lasers and more particularly to resonantly photo-pumped x-ray lasers.

The first operational laboratory x-ray laser, which used collisional excitation as the pumping mechanism, was taught by Campbell and Rosen in U.S. Pat. No. 4,827,479 issued May 2, 1989. Moreover, this x-ray laser is also described by Rosen et al. in Physical Review Letters 54, 106 (1985), with a discussion of the experimental demonstration of the laser provided by Matthews et al in Physical Review Letters 54, 110 (1985). This seminal work was also reported in Physics Today, March 1985, at pages 17 to 19. Additionally, a recent review of soft x-ray lasers is provided by Matthews and Rosen in Scientific American, December 1988, at pages 86 to 91.

The following are representative of the state-of-the-art in x-ray laser research and speculation: Cochran et al, in U.S. Pat. No. 4,803,687 issued Feb. 7, 1989, describe a sodium-neon laser target wherein Ne IX (He-like Ne) is resonantly photo-pumped by Na X (He-like Na). A carbon thermal buffer layer is required between the sodium and neon layers.

Hagelstein, in U.S. Pat. No. 4,660,203 issued Apr. 21, 1987, describes x-ray lasers wherein various multiply ionized species are used to pump high energy transitions in helium-like or hydrogen-like N, O, F, C or rare gases. For example, F-like Ti is indicated as a pump material at 24.907Å to drive a He-like N laser. The lasant material is located within a hollow container fabricated from parylene, or a material substantially transparent to radiation in the wavelength range from 60 to 300 Angstroms, and is multiply-ionized and undergoes at least one super-radiant laser transition.

Silfvast, in U.S. Pat. No. 4,592,064 issued May 27, 1986, discloses a scheme that permits high gain at visible and UV wavelengths in species such as Cd and Zn. A population inversion is established by producing a plasma that generates x-ray pulses in the 150 to 650 Angstrom (Å) wavelength range.

Elton, in U.S. Pat. No. 4,592,056 issued May 27, 1986, describes x-ray lasing systems wherein a neon-like sulfur plasma is used to pump a lithium-like neon plasma, and wherein a lithium-like silicon plasma is used to pump a lithium-like magnesium plasma.

Harris, in U.S. Pat. No. 4,380,072 issued Apr. 12, 1983, describes a method of exciting atoms to a storage level, then irradiating the excited atoms and thereby raising them to a higher level, whereupon the atoms lase to a lower level, other than ground, which is simultaneously emptied. This method results in the generation of XUV radiation.

Mani et al, in U.S. Pat. No. 4,229,708 issued Oct. 21, 1980, describe an x-ray laser wherein lithium-like atoms or ions are stimulated to lase by resonant or non-resonant antistokes Raman processes. The laser functions by directing filtered, black-body radiation in the soft x-ray region into a lithium-like vapor.

Jaegle et al, in U.S. Pat. No. 3,826,996 issued Jul. 30, 1974, describe obtaining a medium having a negative absorption coefficient within the ultra-violet and x-ray range, by focusing a giant-pulse laser beam on an aluminum target.

Despite tremendous progress in the development of x-ray lasers over the last several years, only two pumping mechanisms have been used to create gain and produce laser output. These have been collisional excitation, in the case of Ne-like and Ni-like lasers, and recombination, in the case of H-like and Li-like lasers.

Proposals have been made of many schemes using the resonant photo-pumping mechanism to drive various x-ray lasers; however, the resonant photo-pumping mechanism has not as yet been actually demonstrated in the x-ray, or even the soft x-ray, region. The shortest wavelength at which significant gain has been measured using resonant photo-pumping is 2163 Å in beryllium-like carbon pumped by a manganese plasma, in work reported by Qi and Krishnan, Phys. Rev. Lett. 59, 2051 (1987).

Nilsen, in U.S. Pat. No. 4,977,572 issued Dec. 11, 1990, describes a resonantly photo-pumped x-ray laser that enhances the gain of several laser lines that also lase because of collisional excitations and recombination processes. An aluminum and erbium foil combination is driven by two beams of intense line focused optical laser radiation. Ground state Ni-like Er ions are resonantly photo-pumped by line emission from H-like Al ions to produce 54–90 Å radiation.

Nilsen in U.S. patent application Ser. No. 07/420,433, filed Oct. 12, 1989, describes a resonantly photo-pumped x-ray laser in the 23–44 Angstrom range. A silicon and dysprosium foil combination is driven by two beams of intense line focused optical radiation. Ground state nickel-like dysprosium ions are resonantly photo-pumped by line emission from hydrogen-like silicon ions.

SUMMARY OF THE INVENTION

It is, therefore, an object of the invention to provide a resonantly photo-pumped x-ray laser.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention, as embodied and broadly described herein, a resonantly photo-pumped x-ray laser is disclosed in which means are provided for producing a quantity of neon-like titanium ions in the ground state, together with means for resonantly photo-pumping two $2p \rightarrow 4d$ transitions in these ions to a pair of $4d$ levels, which decay directly to the $3p$ upper laser states of the laser, which lases on several $3p \rightarrow 3s$ transitions with wavelengths in the 280–510 Å range. The resonant photo-pumping is accomplished by a means that generates a quantity of fluorine-like vanadium ions in two $3d$ states, in spatial and temporal proximity to the neon-like titanium ions, with the resonant photo-pumping taking place on two $3d \rightarrow 2p$ emission lines from the fluorine-like vanadium ions.

In an embodiment of this invention, the x-ray laser comprises a vanadium foil upon which is deposited a titanium film, which together constitute a vanadium and titanium combination. The V foil is generally thicker than the Ti layer. Means are provided for simultaneously illuminating the vanadium and the titanium sides of the combination with beams of line focused, high power optical laser radiation. This driving illumination occurs over adjacent, long and thin and generally rectangular portions of the surfaces of the vanadium foil and titanium film combination. Preferably, the vanadium foil has a thickness in the approximate range from 100 to 5,000 Angstroms; and the titanium film has a thickness in the approximate range from 10 to 2000 Angstroms. Preferably, the two simultaneous, illuminating beams of driving optical laser radiation individually each have wavelengths within the approximate range from 0.25 to 11 microns; and temporal full widths at half maximum amplitude in the approximate range from 10 to 2000 picoseconds. Preferably, the beam that illuminates the vanadium side of the combination has a power density in the approximate range extending from $5 \times 10^{12}$ to $5 \times 10^{13}$ watts/cm$^2$, and the beam that illuminates the titanium side of the combination has a power density in the approximate range extending from 5633 $10^{12}$ to $5 \times 10^{13}$ watts/cm$^2$. Preferably, the adjacent, illuminated, generally rectangular portions of the vanadium and titanium combination, each have a length in the approximate range from 0.4 to 8.0 centimeters, and a width in the approximate range from 50 to 200 microns.

In a particular illustrative embodiment, optical laser pulses of about 0.5 micron wavelength, 600 ps pulsewidth, and intensity of $1 \times 10^{13}$ W/cm$^2$ (on each side) are used. The Ti foil has a thickness of 20 Å, and the V foil thickness is 1000 Å. The illumination region has a length of 4.5 cm and a width of 120 microns.

The method for providing x-ray laser radiation of this invention, comprises the steps of providing a quantity of neon-like titanium ions in the ground state, and resonantly photo-pumping two $2p \rightarrow 4d$ transitions of these ions to a pair of $4d$ levels, which decay directly to $3p$ upper laser states which lase on several $3p \rightarrow 3s$ transitions. The resonantly photo-pumping step may be accomplished by generating a quantity of $3d$ state fluorine-like vanadium ions, in spatial and temporal proximity to the neon-like titanium ions, and resonantly photo-pumping on two $3d \rightarrow 2p$ emission lines.

In another aspect of this invention, x-ray laser radiation may be provided by the single step of simultaneously illuminating the opposite sides of a combination comprised of a vanadium foil, upon which a titanium film has been deposited, with two driving beams of line focused, high power optical laser radiation, over adjacent, long and thin and generally rectangular portions of the vanadium and titanium sides of the combination.

The benefits and advantages of the present invention, as embodied and broadly described herein, include, inter alia, the provision of a novel resonantly photo-pumped x-ray laser.

BRIEF DESCRIPTION OF THE DRAWINGS

The accompanying drawings, which are incorporated herein and form a part of the specification, illustrate an embodiment of the invention and, together with the description, serve to explain the principles of the invention. In the drawings:

FIG. 1B is a table of laser transitions, wavelengths and gains for Ne-like Ti.

DETAILED DESCRIPTION OF THE INVENTION

Figure 1A:
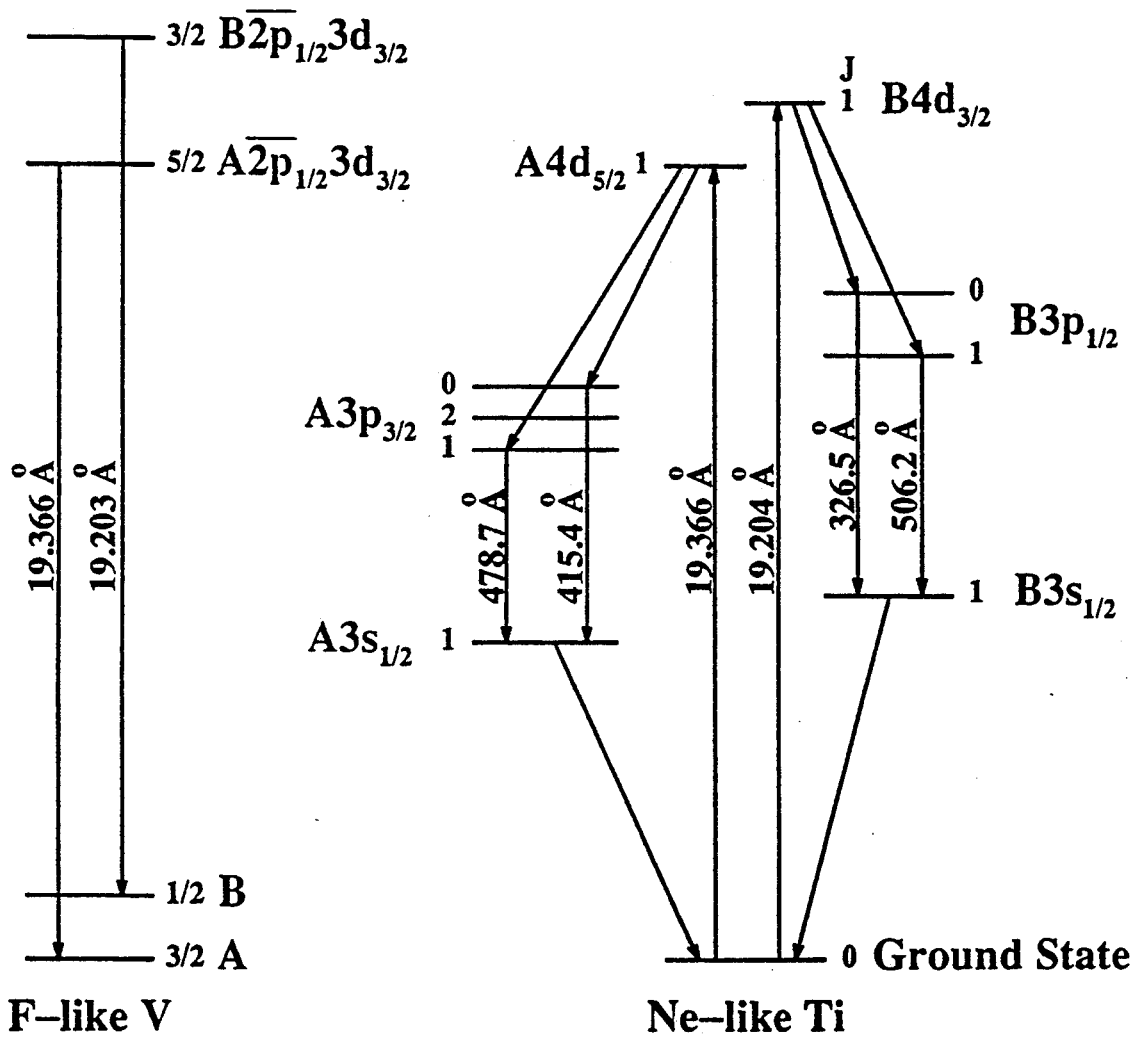
FIG. 1A is the energy level diagram of the x-ray laser of this invention.

The lasing scheme of the novel x-ray laser of this invention is shown in the energy level diagram of FIG. 1A. The laser uses a combination of titanium (Z=22) and vanadium (Z=23). The process comprises resonantly photo-pumping neon-like titanium (Ne-like Ti) ions in the ground state (J=0) to the $\overline{2p}_{3/2}4d_{5/2}$ (J=1) and $\overline{2p}_{\frac{1}{2}}4d_{3/2}$ (J=1) levels. This is accomplished using fluorine-like vanadium (F-like V) $2p_{3/2}\overline{2p}_{\frac{1}{2}}3d_{3/2}$ (J=5/2) to $\overline{2p}_{3/2}$ (J=3/2) line emission at 19.366 Å, and $\overline{2p}_{\frac{1}{2}}2p_{\frac{1}{2}}3d_{3/2}$ (J=3/2) to $\overline{2p}_{\frac{1}{2}}$ (J=½) line emission at 19.203 Å.

As shown in FIG. 1A, the basic lasing scheme consists of the F-like V $3d \rightarrow 2p$ lines resonantly photo-pumping electrons in the ground state of the Ne-like Ti ions to the $\overline{2p}_{3/2}4d_{5/2}$ (J=1) and $\overline{2p}_{\frac{1}{2}}4d_{3/2}$ (J=1) levels. The bar over the $2p$ state indicates a hole or vacancy in the closed L shell [1s$^2$2s$^2$2p$^6$] or neon-like core. The notation A represents a $2p_{3/2}$ hole ($\overline{2p}_{3/2}$) in the neon-like core, while B represents a $2p_{\frac{1}{2}}$ hole ($\overline{2p}_{\frac{1}{2}}$). The value of the total angular momentum J is given next to each level. The $\overline{2p}_{\frac{1}{2}}4d_{3/2}$ (J=1) level decays preferentially to the $\overline{2p}_{\frac{1}{2}}3p_{\frac{1}{2}}$ (J=0) and $\overline{2p}_{\frac{1}{2}}3p_{\frac{1}{2}}$ (J=1) levels, which are the upper laser states. These upper laser levels lase to the $\overline{2p}_{\frac{1}{2}}3s_{\frac{1}{2}}$ (J=1) level, which is the lower laser level. The lower laser level decays back to the Ne-like ground state. The $\overline{2p}_{3/2}4d_{5/2}$ (J=1) level decays strongly to the $\overline{2p}_{3/2}3p_{3/2}$ (J=0) and $\overline{2p}_{3/2}3p_{3/2}$ (J=1) levels. These two levels lase to the $\overline{2p}_{3/2}3s_{\frac{1}{2}}$ (J=1) level. Other levels are also fed by the decay of the $4d$ levels and result in additional laser lines (not shown). All the laser transitions, along with the wavelengths and gains of the laser lines, are given in FIG. 1B.

Even in the absence of any fluorine-like vanadium pumping radiation, it is expected that some laser transition lines would be present in a neon-like titanium plasma, because of collisional excitation and recombination processes. However, the presence of fluorine-like vanadium pumping radiation is expected to significantly enhance the gain of each of the lines. On the other hand, some laser lines are only expected to exhibit gain when fluorine-like vanadium is present to photo-pump the neon-like titanium.

Figure 2:
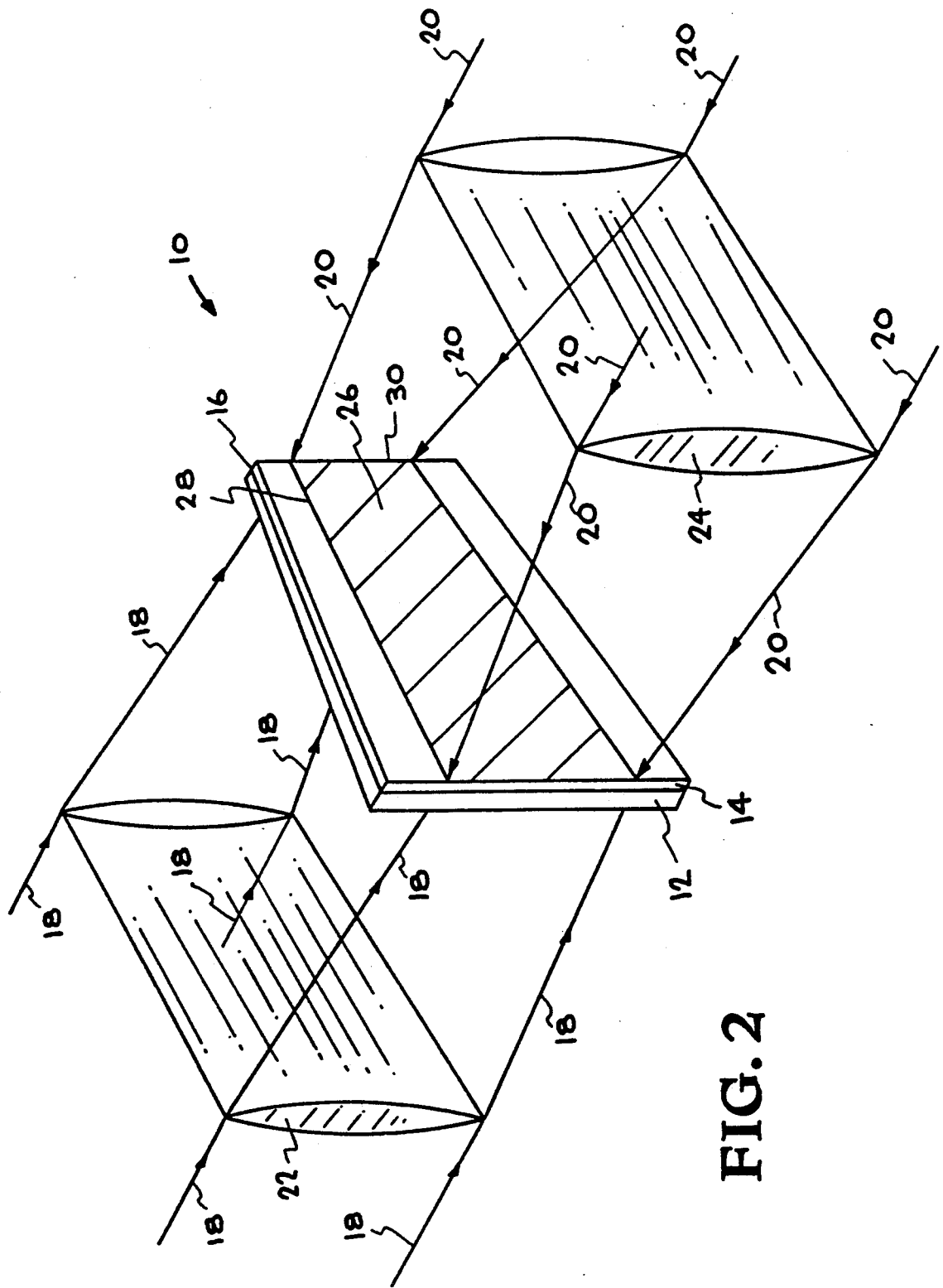
FIG. 2 is a schematic view of an x-ray laser in accordance with this invention, shown at an early time in its performance.
Figure 3:
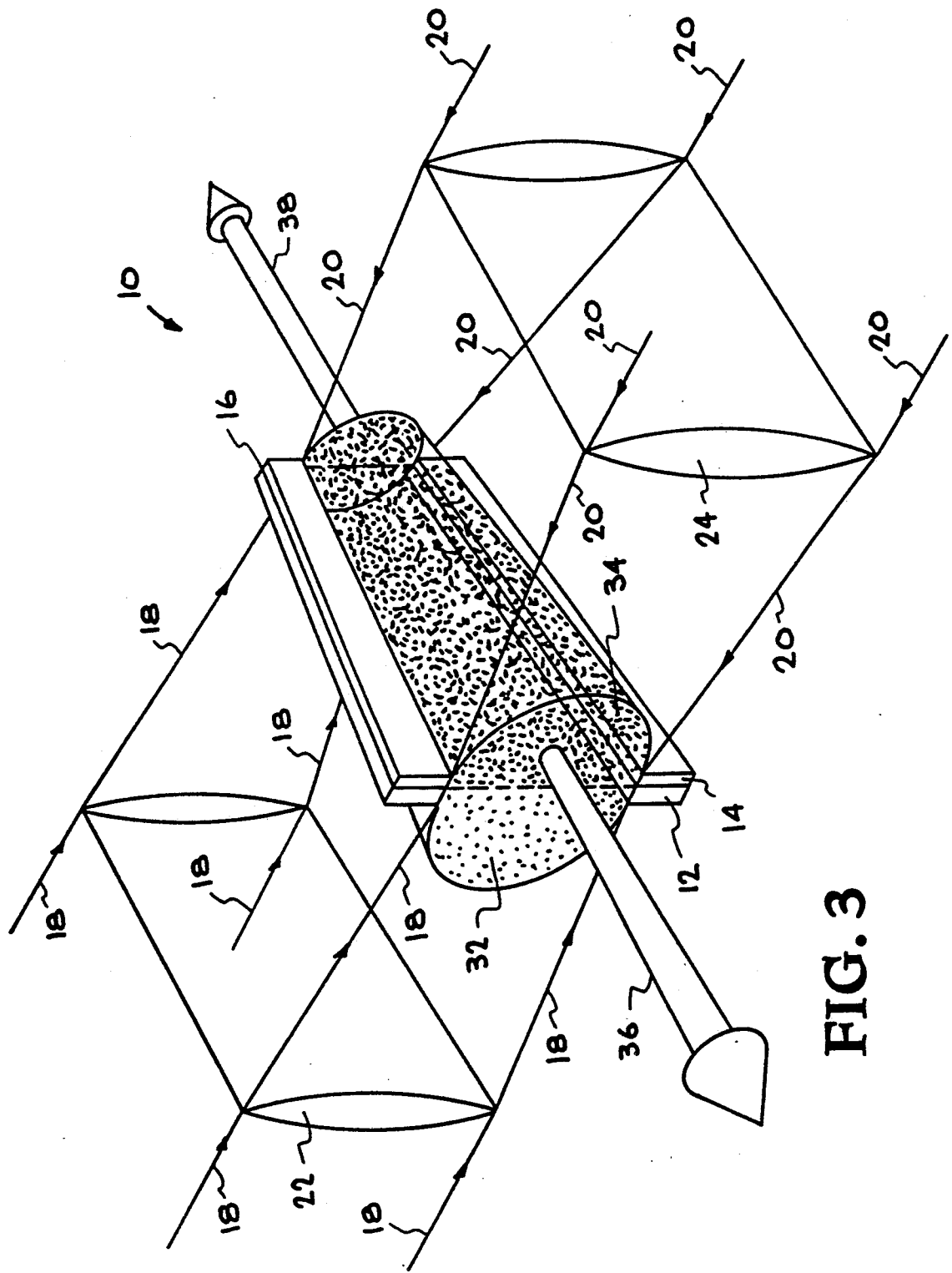
FIG. 3 is a schematic view of the x-ray laser of FIG. 2, shown at a later time in its performance, when vigorously producing x-ray laser radiation.

FIGS. 2 and 3 offer a schematic view of an x-ray laser 10, in accordance with this invention. X-ray laser 10 is the presently preferred embodiment of this invention, although it is believed that many different and highly beneficial embodiments of this invention may be realized in various situations and applications. X-ray laser 10 is shown at an early time in its performance in FIG. 2, and at a later time, when vigorously producing x-ray laser radiation, in FIG. 3. A consistent set of reference numerals is used in FIGS. 2 and 3. Since laser 10 is an x-ray laser, it utilizes no mirrors; therefore, amplification takes place on only a single pass through the system. In this respect, x-ray laser 10 is typical of several previously known x-ray lasers.

X-ray laser 10 is comprised of a vanadium foil 12, that is flat and preferably has a thickness in the approximate range from 100 to 5000 Angstroms. A titanium film 14, flat and having a preferred thickness in the approximate range from 10 to 2000 Angstroms, is deposited upon, or attached to, vanadium foil 12, by techniques that are very well-known in the prior art. In some embodiments of this invention, vanadium foil 12 and titanium film 14 may each be attached to and supported by a very thin separating Plastic layer, not shown, comprised of, for example, mylar or parylene. This plastic layer may provide hydrodynamic isolation between the two foils. Vanadium foil 12 and titanium film 14 together provide a combination 16. The vanadium side of combination 16 is illuminated by a beam of line focused, high power optical laser radiation 18, while, simultaneously, the titanium side of combination 16 is illuminated by a beam of line focused, high power optical laser radiation 20, as shown. As schematically indicated, optical laser beams 18 and 20 are line focused by a pair of cylindrical lenses 22 and 24, respectively, by techniques that are very well known in the laser-related arts. Preferably, the two simultaneous beams of optical laser radiation 18 and 20 individually each have a wavelength or wavelengths in the approximate range from 0.25 to 11 microns, and a temporal full width at half maximum amplitude in the approximate range from 10 to 2000 picoseconds. Optical laser beam 18, that illuminates vanadium foil 12, preferably has a power density in the approximate range extending from $5 \times 10^{12}$ to $5 \times 10^{13}$ watts/cm$^2$, and optical laser beam 20, that illuminates titanium film 14, preferably has a power density in the approximate range extending from $5 \times 10^{12}$ to $5 \times 10^{13}$ watts/cm$^2$. Optical laser pulses having characteristics within these ranges are routinely provided by the Lawrence Livermore National Laboratory, located at Livermore, Calif. Optical laser beams 18 and 20 each illuminate an adjacent, long and thin and generally rectangular area on an opposite side of the vanadium and titanium combination 16. In particular, an area 26 on the titanium side of combination 16, is shown in FIG. 2 as illuminated by the optical laser beam 20. A similar area, not specifically shown, on the vanadium side of combination 16, is illuminated by optical laser beam 18. The area, or surface portion, 26 preferably has a length 28 in the approximate range from 0.4 to 8.0 centimeters, and a width 30 in the approximate range from 50 to 200 microns.

In a particular preferred embodiment, the optical pulses have a wavelength of about 0.5 microns, and a pulsewidth of 600 ps. The Ti foil has a thickness of 20 Å and the V foil is 1000 Å thick. The illumination region on the foils is 4.5 cm long and 120 microns wide. The illumination power density on each side of the foil combination is $1 \times 10^{13}$ W/cm$^2$.

As shown in FIG. 3, the optical laser beams 18 and 20 energetically convert the portions of the combination 16 upon which they impinge, into a vanadium plasma 32, and a titanium plasma 34. The titanium plasma 34 provides very many neon-like titanium ions in the ground state. The vanadium plasma 32, which is in spatial and temporal proximity to plasma 34, provides an abundant quantity of fluorine-like vanadium ions in the two 3d states, which vanadium ions emit a large amount of 3d to 2p line emission radiation at 19.366 Å and 19.203 Å, which radiation proceeds into plasma 34 and resonantly photo-pumps many of the neon-like titanium ions that are contained in the plasma 34, to the desired pair of 4d levels. The neon-like titanium ions, in the 4d levels, in plasma 34, proceed to provide, in accordance with the mechanisms particularly discussed above in reference to the energy level diagram of FIG. 1A, a pair of x-ray laser beams 36 and 38, schematically indicated, that comprise x-ray laser radiation.

A resonantly photo-pumped laser requires a good resonance between the lasant and a strong pump line which are in temporal and spatial proximity. Temporal and spatial proximity mean that the V and Ti ions are sufficiently close in space and time so that the pump energy can be absorbed by the lasant. The F-like V $\overline{2p}_{3/2}\overline{2p}_{1/2}3d_{3/2}$ ($J=5/2$)→$\overline{2p}_{3/2}$ ($J=3/2$) pump line is measured to be at 19.366 Å, while the F-like V $\overline{2p}_{1/2}\overline{2p}_{1/2}3d_{3/2}$ ($J=3/2$)→$\overline{2p}_{1/2}$ ($J=\frac{1}{2}$) pump line is measured to be at 19.203 Å. The ground state to the $\overline{2p}_{3/2}4d_{5/2}$ ($J=1$) transition in Ne-like Ti is measured to be at 19.366 Å, while the ground state to the $\overline{2p}_{1/2}4d_{3/2}$ ($J=1$) transition is measured to be at 19.204 Å. Thus, good resonance exists.

The 3d→2p lines of F-like V have sufficient pump strength to pump the Ne-like Ti ions. The table of FIG. 1B provides the gain of the various laser transitions for three different values of the pump strength, 0.005, 0.010, and 0.020 photons per mode. Ionization balance can be achieved between the V and Ti. Ne-like high Z plasmas have been made routinely in the laboratory. An advantage of the V-pumped Ti scheme is that the strong F-like V 3d→2p lines have sufficient energy to photoionize Na-like Ti to Ne-like Ti, but they do not have enough energy to photoionize the ground state of Ne-like Ti to F-like Ti. This facilitates making a large population of Ne-like Ti without the fear of overionizing.

Low electron densities near $10^{18}$/cc are required for the Ti lasant region to minimize collisional effects that tend to equilibrate the populations in the Ti lasing levels. Higher electron densities, near $10^{20}$/cc, and electron temperatures, between 100–300 eV, are required in the V plasma to produce the strong pump lines required. Therefore, the Ti will lase in the coronal region of the plasma and be pumped by the adjacent V region which is hotter and denser.

The gains achievable in Ne-like Ti by resonant photo-pumping were calculated assuming there were two strong F-like lines of equal strength available to pump the two Ne-like Ti 2p→4d transitions, for several values of the pump line strength, 0.005, 0.010, and 0.020 photons per mode, for a 100μ thick pre-expanded foil of Ti at an initial ion density of $1.0 \times 10^{19}$ ions/cc, an electron density determined by the ionization of the Ti, and initial ion and electron temperatures of 50 eV. The foil was then allowed to expand and cool while a constant pump strength for the F-like V lines was applied to the calculation. After 3.0 ns, the plasma region 300μ from the surface of the foil is at an electron temperature of 20 eV, a Ti ion density of $1.71 \times 10^{17}$/cc, and an electron density of $1.85 \times 10^{18}$/cc. Under these conditions 14% of the Ti ions are in the Ne-like ground state. FIG. 1B shows the gains of the Ne-like Ti laser lines under these plasma conditions. Five of the lines have gains greater than 5 cm$^{-1}$ for a pump of 0.01 photons per mode, with the shortest wavelength of the five being at 326.5 Å. The gains of several lines are over 10 cm$^{-1}$ at the higher pump strength. The lasing region is approximately 200μ thick.

To provide the low Ti ion densities for optimal pumping, a weak prepulse, e.g., a few nanoseconds before the main optical pulse, can be applied. For example, optical beam 20 (and 18) can include a lower energy prepulse before the higher energy illumination pulse. The prepulse is of sufficient energy to produce a plasma in the ground state, while the higher energy pulse can excite the plasma to the higher states. The prepulse can be applied at the appropriate time so that the Ti plasma has spread spatially to produce the desired density when the higher excitation pulse is applied.

Instead of thin foils with double sided illumination, thick slab targets with single sided illumination could also be used. Ti and V plasmas in the above-described states will be formed so that resonant photo-pumping occurs.

It is thus appreciated that in accordance with the invention as herein described and shown in FIGS. 1 to 3, a novel resonantly photo-pumped x-ray laser is provided. The Ne-like Ti x-ray laser lases on several $3p \rightarrow 3s$ lines ranging from 280–510 Å based on resonant photo-pumping using radiation from two $3d \rightarrow 2p$ emission lines in F-like V.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto

I claim:

1. An x-ray laser comprising:
   means for providing a quantity of neon-like titanium ions in the J=0 ground state; and
   means for resonantly photo-pumping the quantity of neon-like titanium ions from their J=0 ground state to the $\overline{2p}_{3/2}4d_{5/2}$ (J=1) and $\overline{2p}_{\frac{1}{2}}4d_{3/2}$ (J=1) levels, which decay directly to the upper laser states of the neon-like titanium.

2. An x-ray laser as recited in claim 1, wherein the means for resonantly photo-pumping the quantity of neon-like titanium ions comprises means for generating, in spatial and temporal proximity to the quantity of neon-like titanium ions, a quantity of fluorine-like vanadium ions in $\overline{2p}_{3/2}\overline{2p}_{\frac{1}{2}}3d_{3/2}$ (J=5/2) and $\overline{2p}_{\frac{1}{2}}\overline{2p}_{\frac{1}{2}}3d_{3/2}$ (J=3/2) states, which resonantly photo-pump on $\overline{2p}_{3/2}\overline{2p}_{\frac{1}{2}}3d_{3/2}$ (J=5/2)$\rightarrow\overline{2p}_{3/2}$ (J=3/2) and $\overline{2p}_{\frac{1}{2}}\overline{2p}_{\frac{1}{2}}3d_{3/2}$ (J=3/2)$\rightarrow\overline{2p}_{\frac{1}{2}}$ (J=½) emission lines.

3. An x-ray laser comprising:
   a vanadium foil;
   a titanium film deposited on the vanadium foil, to thereby provide a vanadium foil and titanium film combination; and
   means for resonantly photo-pumping the titanium to upper laser states by simultaneously illuminating the opposite sides of said vanadium foil and titanium film combination with a first and a second beam of line focused, high power optical laser radiation, with the illumination occuring over adjacent, long and thin and generally rectangular portions of the vanadium and titanium combination 4. An x-ray laser as recited in claim 3, wherein the means for resonantly photo-pumping includes a prepulse of energy to produce a titanium plasma in the ground state.

5. An x-ray laser as recited in claim 3, wherein the vanadium foil has a thickness in the approximate range from 100 to 5000 Angstroms; wherein the titanium film has a thickness in the approximate range from 10 to 2000 Angstroms; wherein the first and second simultaneous beams of optical laser radiation individually each have a wavelength in the approximate range from 0.25 to 11 microns and a temporal full width at half maximum amplitude in the approximate range from 10 to 2000 picoseconds, with the beam that illuminates the vanadium side of the combination having a power density in the approximate range from $5 \times 10^{12}$ to $5 \times 10^{13}$ watts/cm$^2$, and with the beam that illuminates the titanium side of the combination having a power density in the approximate range from $5 \times 10^{12}$ to $5 \times 10^{13}$ watts/cm$^2$; and wherein the adjacent, generally rectangular illuminated portions of the vanadium and titanium combination, each have a length in the approximate range from 0.4 to 8.0 centimeters, and a width in the approximate range from 50 to 200 microns.

6. An x-ray laser as recited in claim 3, wherein the vanadium foil has a thickness of about 1000 Angstroms; wherein the titanium film has a thickness of about 20 Angstroms; wherein the first and second simultaneous beams of optical laser radiation have a wavelength of about 0.5 microns and a temporal full width at half maximum amplitude of about 600 picoseconds, with the beams that illuminate the vanadium and titanium sides of the combination each having a power density of about $1 \times 10^{13}$ watts/cm$^2$; and wherein the adjacent, generally rectangular illuminated portions of the vanadium and titanium combination, each have a length of about 4.5 centimeters, and a width of about 120 microns.

7. A method for providing resonantly photo-pumped x-ray laser radiation, the method comprising the steps of:
   providing a quantity of neon-like titanium ions in the J=0 ground state; and
   resonantly photo-pumping the quantity of neon-like titanium ions from their J=0 ground state to the $\overline{2p}_{3/2}4d_{5/2}$ (J=1) and $\overline{2p}_{\frac{1}{2}}4d_{3/2}$ (J=1) levels, which decay directly to upper laser states of said neon-like titanium.

8. The method of claim 7, wherein the resonantly photo-pumping step comprises the step of generating a quantity of fluorine-like vanadium ions, in the $\overline{2p}_{3/2}\overline{2p}_{\frac{1}{2}}3d_{3/2}$ (J=5/2) and $\overline{2p}_{\frac{1}{2}}\overline{2p}_{\frac{1}{2}}3d_{3/2}$ (J=3/2) states, in spatial and temporal proximity to the quantity of neon-like titanium ions, whereby the resonant photo-pumping occurs on $\overline{2p}_{3/2}\overline{2p}_{\frac{1}{2}}3d_{3/2}$ (J=5/2)$\rightarrow\overline{2p}_{3/2}$ and $\overline{2p}_{\frac{1}{2}}\overline{2p}_{\frac{1}{2}}3d_{3/2}$ (J=3/2)$\rightarrow\overline{2p}_{\frac{1}{2}}$ (J=½) emission lines in the fluorine-like vanadium.

9. A method for providing x-ray laser radiation comprising the step of resonantly photo-pumping titanium ions to upper states by simultaneously illuminating the opposite sides of a combination comprised of a vanadium foil that has a titanium film deposited on one side thereof, with a first and a second beam of line focused, high power optical laser radiation, over adjacent, long and thin and generally rectangular portions of the vanadium an titanium combination.

10. The method of claim 9 wherein the step of resonantly photo-pumping includes applying a prepulse of energy to the titanium film to produce titanium plasma in the ground state.

* * * * *